(12) United States Patent
Matsuura

(10) Patent No.: US 11,376,695 B2
(45) Date of Patent: Jul. 5, 2022

(54) WORK TABLE

(71) Applicant: OKUMA CORPORATION, Niwa-Gun (JP)

(72) Inventor: Koki Matsuura, Niwa-Gun (JP)

(73) Assignee: Okuma Corporation, Niwa-Gun (JP)

( * ) Notice: Subject to any disclaimer, the term of this patent is extended or adjusted under 35 U.S.C. 154(b) by 335 days.

(21) Appl. No.: 16/844,336

(22) Filed: Apr. 9, 2020

(65) Prior Publication Data

US 2020/0353579 A1    Nov. 12, 2020

(30) Foreign Application Priority Data

May 7, 2019   (JP) .............................. JP2019-087772

(51) Int. Cl.
*B25B 11/00*   (2006.01)
*B23Q 1/01*    (2006.01)
*B25B 5/06*    (2006.01)
*B25B 11/02*   (2006.01)
*B24B 41/06*   (2012.01)

(52) U.S. Cl.
CPC ................ *B23Q 1/015* (2013.01); *B25B 5/06* (2013.01); *B25B 11/02* (2013.01); *B24B 41/06* (2013.01)

(58) Field of Classification Search
CPC ........... B25B 1/00; B25B 1/02; B25B 1/2484; B25B 11/00; B25B 11/02; B23Q 3/00; B23Q 3/06; B23Q 3/066; B23Q 3/154
See application file for complete search history.

(56) References Cited

U.S. PATENT DOCUMENTS

| | | | | |
|---|---|---|---|---|
| 4,445,675 A | * | 5/1984 | Kitaura | .................. B25B 5/061 269/93 |
| 5,788,225 A | * | 8/1998 | Iwata | ..................... B23Q 3/103 269/309 |
| 2008/0084017 A1 | * | 4/2008 | Barziza | .................. B23Q 3/103 269/100 |
| 2013/0334753 A1 | * | 12/2013 | Stanifer | ................ B23Q 3/069 29/559 |
| 2016/0167201 A1 | * | 6/2016 | Saraie | ....................... B25B 1/10 29/559 |
| 2020/0353579 A1 | * | 11/2020 | Matsuura | .................. B25B 5/08 |

FOREIGN PATENT DOCUMENTS

JP    2000-176769 A1    6/2000

* cited by examiner

*Primary Examiner* — Lee D Wilson
(74) *Attorney, Agent, or Firm* — Burr & Brown, PLLC

(57) ABSTRACT

A work table includes a baseplate, a plurality of levers, a clamp plate, a lock mechanism, and an unlocking mechanism. The plurality of levers are disposed on a concentric circle on the baseplate. Guide bars protrude upward from the plurality of levers. The plurality of levers are each disposed to be movable in a radial direction of the circle. The clamp plate is placed on top surfaces of the levers. The clamp plate has elongated holes in the radial direction through which the guide bars penetrate. The lock mechanism urges the clamp plate downward such that the respective levers are fixed in a manner sandwiched between the baseplate and the clamp plate. The unlocking mechanism releases the fixing of the respective levers by the lock mechanism.

3 Claims, 2 Drawing Sheets

WORK TABLE

BACKGROUND OF THE INVENTION

This application claims the benefit of Japanese Patent Application Number 2019-087772 filed on May 7, 2019, the entirety of which is incorporated by reference.

TECHNICAL FIELD OF THE INVENTION

The disclosure relates to a work table used to store workpieces in, for example, an automatic processing system for workpiece.

DESCRIPTION OF RELATED ART

In an automatic processing system that conveys a workpiece to a machine tool for processing, a work table that stores a large number of workpieces is used to deliver and receive the workpiece between the machine tool and the work table by robot and loader. Usually, three guide bars are fixed in a state where the guide bars are brought into abutment with outer surfaces of the workpieces, and thus the work table ensures stably stacking the workpieces in multistage. Conventionally, a worker moves levers to which the guide bars are fixed and fixes them with bolts to position and fix the respective guide bars. However, labor and time are taken for a work to clench and loose many bolts and time for setup change becomes long, and further a degree of fixing and a work period vary.

Therefore, Japanese Patent Application Publication No. 2000-176769 discloses a positioning structure that includes arms provided with guide rods to be movable along guide holes in a radial direction provided in a placement table. An endless timing belt is wound between pulleys coupled to the respective arms via rotation shafts, and one guide rod is matched with a diameter of a workpiece. Thus, the other guide rods are moved via the timing belt so as to abut on the workpiece.

Although the conventional positioning structure facilitates positioning the guide rods, since the rotation shaft and the pulley are disposed in, each arm and the timing belt is also used, the number of components increases, resulting in cost increase. Additionally, since each pulley is locked against tension of the timing belt, a locking member and an adjustment screw are necessary, resulting in increase in the number of components as well. Moreover, a work to clench and loose the adjustment screw with an industrial tool is required as a result, and labor is taken.

Therefore, an object of the disclosure is to provide a work table that easily and surely locks and unlocks guide bars toollessly and is excellent in work efficiency regarding a setup.

SUMMARY OF THE INVENTION

In order to achieve the above-described object, a work table according to a first aspect of the disclosure is provided. The work table includes a baseplate, a plurality of levers, a clamp plate, a lock mechanism and an unlocking mechanism. The plurality of levers are disposed on a concentric circle on the baseplate. Guide bars protrude upward from the plurality of levers. The plurality of levers are each disposed to be movable in a radial direction of the circle. The clamp plate is placed on top surfaces of the levers. The clamp plate has elongated holes in the radial direction through which the guide bars penetrate. The lock mechanism urges the clamp plate downward such that the respective levers are fixed in a manner sandwiched between the baseplate and the clamp plate. The unlocking mechanism releases the fixing of the respective levers by the lock mechanism.

With the disclosure according to a second aspect of the disclosure, which is in the first aspect of the disclosure, the lock mechanism includes a locking member and a spring member. The locking member is engaged with the clamp plate, projects downward, and penetrates the baseplate. The spring member pulls and urges the locking member downward on a back side of the baseplate.

With the disclosure according to a third aspect of the disclosure, which is in the second aspect of the disclosure, the unlocking mechanism includes an unlocking member and an operation member. The unlocking member is disposed to be movable up and down on a downward extension of the locking member. The operation member moves the unlocking member upward to push up the locking member.

With the disclosure according to the first aspect, the plurality of levers can be simultaneously fixed in a manner sandwiched with the baseplate and the clamp plate without the use of, for example, bolts, and also simultaneously releasing the fixing is possible. Thus, the positioning of the guide bars can be performed in a short time, Since the clamp plate is urged downward for lock, the degree of fastening by the worker does not vary and therefore the locking can be performed always with the identical urging force. Furthermore, since an industrial tool is unnecessary, trouble caused by leaving the industrial tool on the work table does not occur. Therefore, the guide bars can be easily and surely locked and unlocked toollessly and work efficiency regarding the setup is excellent.

With the disclosure according to the second aspect, in, addition to the effect of the first aspect, since the lock mechanism includes the locking member and the spring member, the lock mechanism is obtained with the simple configuration.

With the disclosure according to the third aspect, in addition to the effect of the second aspect, since the unlocking mechanism includes the unlocking member and the operation member, the unlock can be performed by the simple operation of the operation member.

DETAILED DESCRIPTION OF THE INVENTION

The following describes embodiments of the disclosure based on the drawings.

Figure 1:
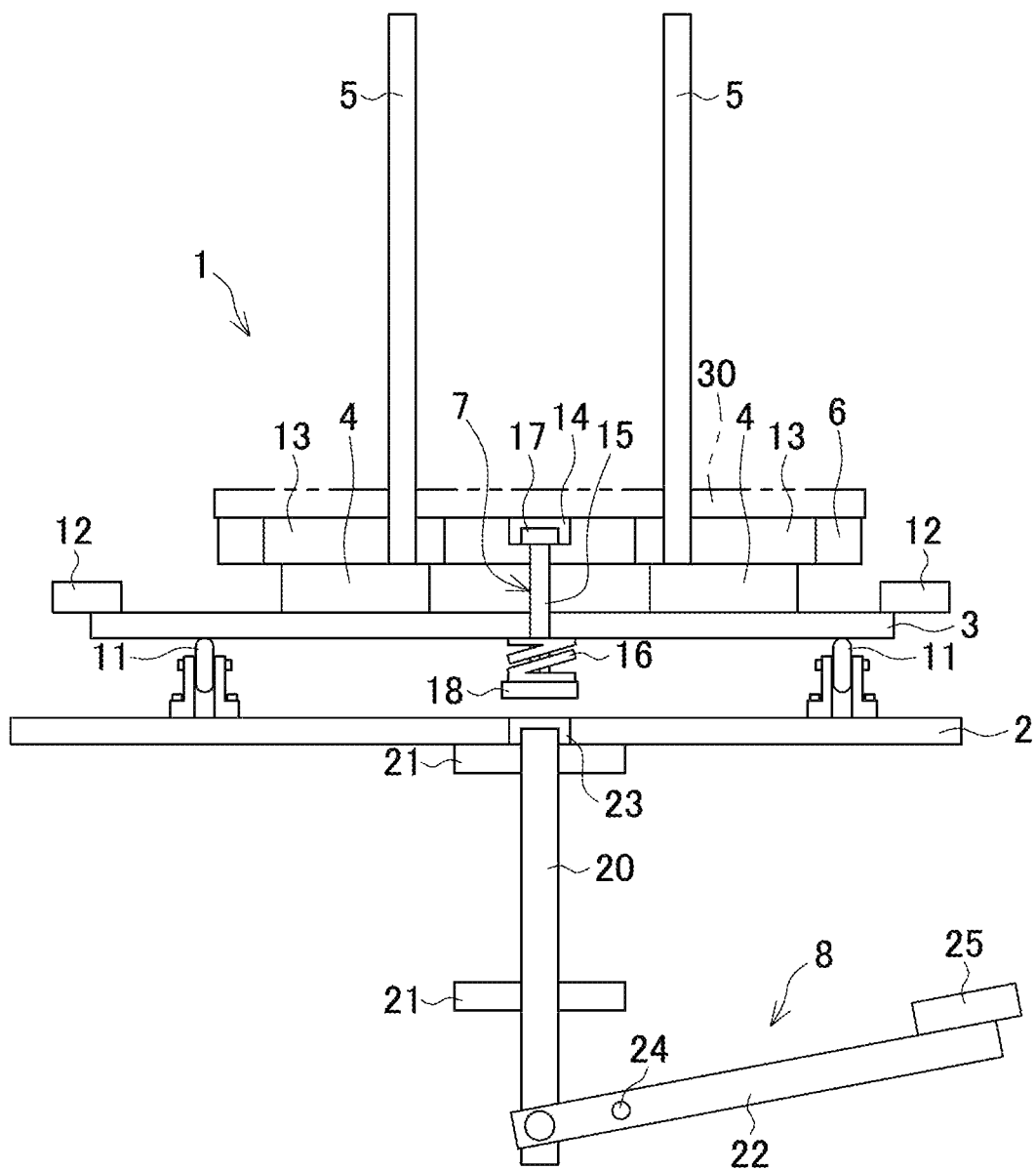
FIG. 1 is a cross-sectional explanatory view of a work table.
Figure 2:
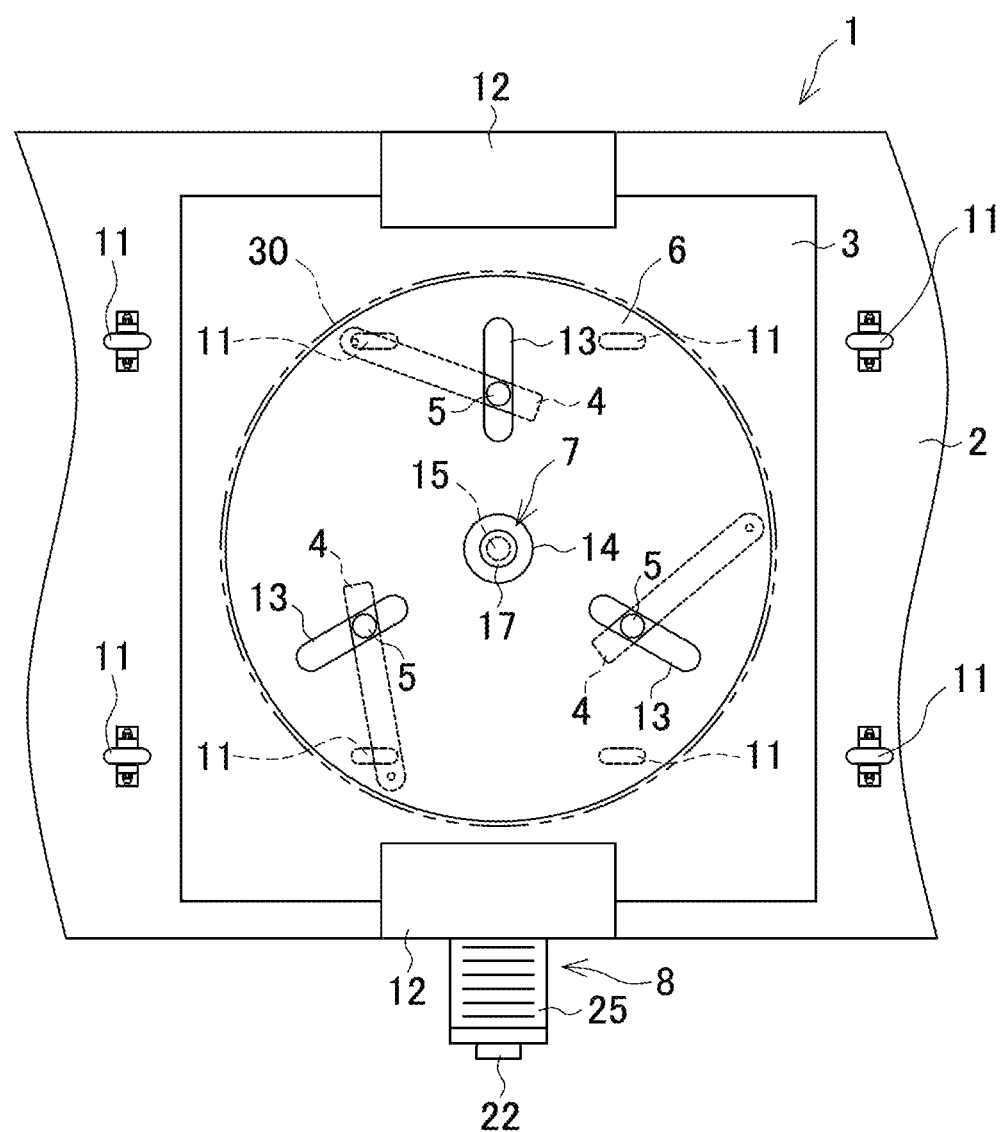
FIG. 2 is a plan view of the work table.

FIG. 1 is a cross-sectional explanatory view illustrating an example of a work table, and FIG. 2 is a plan view of the work table.

A work table 1 includes a top plate 2, a baseplate 3, three levers 4, a clamp plate 6, a lock mechanism 7, and an unlocking mechanism 8. The baseplate 3 is placed above the top plate 2. The levers 4 where guide bars 5 protrude upward are placed on the baseplate 3 to be movable in a radial direction. The clamp plate 6 is placed above the levers 4. The lock mechanism 7 pulls and urges the clamp plate 6 downward. The unlocking mechanism 8 can optionally release the pulling and urging by the lock mechanism 7.

The top plate 2 is horizontally supported by a setup station with a leg (not illustrated). Rollers 11 are disposed on the top plate 2 to movably support a lower surface of the baseplate 3 with the rollers 11. Additionally, the top plate 2 includes uplift prevention plates 12 that prevent an uplift of the baseplate 3.

The levers 4 are disposed on a top surface of the baseplate 3 at regular intervals on a concentric circle and have outer ends swingably supported to the baseplate 3. The guide bars 5 are disposed on the other ends closer to a center of the levers 4 and project upward via elongated holes 13 in the radial direction disposed in the clamp plate 6.

The clamp plate 6 has a disk-shape in plan view and forms a circular depressed portion 14 at the center.

The lock mechanism 7 includes a lock bar 15 engaged with the clamp plate 6 and a coil spring 16 that pulls and urges the lock bar 15 downward. The lock bar 15 penetrates the clamp plate 6 from above at a position of the depressed portion 14 and engages a large-diameter engaging portion 17 on its upper end with a bottom surface of the depressed portion 14. Additionally, the lock bar 15 penetrates the baseplate 3, and the coil spring 16 is externally mounted between a large-diameter retaining portion 18, which is disposed on a lower end of the lock bar 15, and the baseplate 3.

The lock bar 15 is pulled and urged downward by the coil spring 16 in an ordinary state, and the clamp plate 6, which is engaged by the engaging portion 17 of the lock bar 15, pushes the levers 4. Thus, the levers 4 are fixed in a manner sandwiched by the baseplate 3 and the clamp plate 6.

Meanwhile, the unlocking mechanism 8 includes an unlocking bar 20 and an operation link 22. The unlocking bar 20 is supported to be movable up and down via upper and lower guides 21 just below the lock bar 15 on the lower side of the top plate 2. The operation link 22 is coupled to a lower end of the unlocking bar 20. The unlocking bar 20 can abut on the lock bar 15 via a through-hole 23 disposed in the top plate 2.

Moreover, the operation link 22 has both ends swingably supported by a fulcrum shaft 24 below the top plate 2. The operation link 22 has one end to which the unlocking bar 20 is coupled and the other end that extends outside the top plate 2 and is provided with a pedal 25.

When the pedal 25 is pressed, the unlocking bar 20 moves upward via the operation link 22 and the unlocking bar 20 is brought into abutment with the retaining portion 18 of the lock bar 15, and thus the lock bar 15 can be pushed up against the urging by the coil spring 16. Thus, friction resistances between the clamp plate 6 and the levers 4 decrease to make an unlock state, allowing the radial movement of the levers 4.

With the work table 1 configured as described above, a lifter plate 30 on which workpieces (not illustrated) are stacked in multistage is conveyed on the unlocking mechanism 8, which is disposed at one position on the work table 1, by a work table circulating mechanism (not illustrated). Therefore, a worker presses the pedal 25 to push up the lock bar 15 and unlock the levers 4 from the clamp plate 6, and moves the guide bars 5 (levers 4) to an outer peripheral side of the clamp plate 6.

Then, the worker places the workpiece at the center of the lifter plate 30 and moves the respective guide bars 5 together with the levers 4 such that the guide bars 5 abut on an outer periphery of the workpiece while pressing the pedal 25 for unlock. Afterwards, when the worker lifts one's foot off the pedal 25, the lock bar 15 is pulled and urged, and the respective levers 4 are locked by the clamp plate 6 and therefore the respective guide bars 5 are positioned as it is. By thus pressing the pedal 25 and releasing the pressing of the pedal 25, the lock and, the unlock of the guide bars 5 can be simultaneously performed.

Thus, the work table 1 according to the above-mentioned embodiment includes the baseplate 3, the plurality of levers 4, the clamp plate 6, the lock mechanism 7, and the unlocking mechanism 8. The plurality of levers 4 are disposed on the concentric circle on the baseplate 3. The guide bars 5 protrude upward from the plurality of levers 4. The plurality of levers 4 are each disposed to be movable in the radial direction of the circle. The clamp plate 6 is placed on the top surfaces of the levers 4. The clamp plate 6 has the elongated holes 13 in the radial direction through which the guide bars 5 penetrate. The lock mechanism 7 urges the clamp plate 6 downward such that the respective levers 4 are fixed in a manner sandwiched between the baseplate 3 and the clamp plate 6. The unlocking mechanism 8 releases the fixing of the respective levers 4 by the lock mechanism 7. Accordingly, the plurality of levers 4 can be simultaneously fixed in a manner sandwiched with the baseplate 3 and the clamp plate 6 without the use of, for example, bolts, and also simultaneously releasing the fixing is possible. Thus, the positioning of the guide bars 5 can be performed in a short time. Since the coil spring 16 is used, a degree of fastening by the worker does not vary and therefore the locking can be performed always with the identical urging force. Furthermore, since an industrial tool is unnecessary, trouble caused by leaving the industrial tool on the work table 1 does not occur. Therefore, the guide bars 5 can be easily and surely locked and unlocked toollessly and work efficiency regarding the setup is excellent.

Especially, the lock mechanism 7 includes the lock bar 15 (locking member) that is engaged with the clamp plate 6, projects downward, and penetrates the baseplate 3, and, the coil spring 16 (spring member) that pulls and urges the lock bar 15 downward on the back side of the baseplate 3. Accordingly, the lock mechanism 7 is obtained with the simple configuration of the lock bar 15 and the coil spring 16.

Additionally, the unlocking mechanism 8 includes the unlocking bar 20 (unlocking member) disposed to be movable up and down on the downward extension of the lock bar 15, and the operation link 22 (operation member) that moves the unlocking bar 20 upward to push up the lock bar 15. Accordingly the unlock can be performed by the simple operation of pressing the pedal 25 provided on the operation link 22.

It should be noted that a shape of the lever is not limited to the above-mentioned embodiment, and the number of levers may be increased. A shape of the elongated hole in the clamp plate is not limited to be the straight line shape and may be an arc shape.

Additionally, the lock mechanism is not limited to the configuration in which one lock bar is disposed at the center of the clamp plate, and a plurality of lock bars may be disposed on an outer peripheral side of the clamp plate.

Furthermore, the locking member is not limited to the bar body in the above-mentioned embodiment and can employ a shape, such as a plate-shaped body and a tubular body. For example, a disc spring may be used as the spring member other than the coil spring, or a weight may be used instead of the spring member.

Meanwhile, the unlocking mechanism is also not limited to the bar body in the above-mentioned embodiment as the unlocking member and can employ a plate-shaped body and a tubular body. The unlocking mechanism needs not be disposed at one position of the work table and may be disposed at a plurality of positions.

Moreover, the number of operation links may be increased, or not the pedal but a lever may be operated to move the unlocking member upward.

Furthermore, it is not limited to the unlocking member that moves up and down. It is conceivable that, for example, the locking member is pushed up by fitting an unlocking member having a wedge shape slidable on the top plate between the locking member and the top plate.

It is explicitly stated that all features disclosed in the description and/or the claims are intended to be disclosed separately and independently from each other for the purpose of original disclosure as well as for the purpose of restricting the claimed invention independent of the composition of the features in the embodiments and/or the claims. It is explicitly stated that all value ranges or indications of groups of entities disclose every possible intermediate value or intermediate entity for the purpose of original disclosure as well as for the purpose of restricting the claimed invention, in particular as limits of value ranges.

What is claimed is:

1. A work table comprising:
   a baseplate;
   a plurality of levers disposed on a concentric circle on the baseplate, guide bars protruding upward from the plurality of levers, the plurality of levers being each disposed to be movable in a radial direction of the circle;
   a clamp plate placed on top surfaces of the levers, the clamp plate having elongated holes in the radial direction through which the guide bars penetrate;
   a lock mechanism that urges the clamp plate downward such that the respective levers are fixed in a manner sandwiched between the baseplate and the clamp plate; and
   an unlocking mechanism that releases the fixing of the respective levers by the lock mechanism.

2. The work table according to claim 1, wherein
   the lock mechanism includes a locking member and a spring member, the locking member is engaged with the clamp plate, projects downward, and penetrates the baseplate, and the spring member pulls and urges the locking member downward on a back side of the baseplate.

3. The work table according to claim 2, wherein
   the unlocking mechanism includes an unlocking member and an operation member, the unlocking member is disposed to be movable up and down on a downward extension of the locking member, and the operation member moves the unlocking member upward to push up the locking member.

* * * * *